United States Patent [19]

Sitler

[11] Patent Number: 5,790,369
[45] Date of Patent: Aug. 4, 1998

[54] POWER TRANSFER DEVICE FOR A UTILITIES DISTRIBUTION PEDESTAL

[75] Inventor: Donald D. Sitler, Tulsa, Okla.

[73] Assignee: LaBarge, Inc., St. Louis, Mo.

[21] Appl. No.: 748,810

[22] Filed: Nov. 14, 1996

[51] Int. Cl.$^6$ .................................................. H02B 1/04
[52] U.S. Cl. .................................. 361/643; 200/50.33
[58] Field of Search ............................ 200/50.01, 50.32, 200/50.33; 361/631–634, 641, 643–673

[56] References Cited

U.S. PATENT DOCUMENTS

| | | | |
|---|---|---|---|
| 3,319,020 | 5/1967 | Shaffer | 200/50.33 |
| 3,492,448 | 1/1970 | Phillips, Jr. | 200/50.33 |
| 3,647,997 | 3/1972 | Nerem | 200/50.33 |
| 3,705,280 | 12/1972 | Harms | 200/50.33 |
| 4,665,284 | 5/1987 | Guinan | 200/50.33 |
| 4,924,041 | 5/1990 | Yee | 200/50.33 |

*Primary Examiner*—Gregory D. Thompson
*Attorney, Agent, or Firm*—Armstrong, Teasdale, Schlafly & Davis

[57] ABSTRACT

A power transfer device for electrically isolating two alternate power sources to a power distribution device so that only one power source is electrically connected to the power distribution device at one time. The power transfer device includes a first switch, connected to the first power source, having a actuator for operating the switch between an "on" position in which the first power source is electrically connected to the distribution pedestal, and an "off" position in which the first power source is electrically disconnected from the distribution pedestal, and a second switch, connected to the second power source, having a actuator for operating the switch between an "on" position in which the second power source is electrically connected to the distribution pedestal, and an "off" position in which the second power source is electrically disconnected from the distribution pedestal. A bar is slidably mounted adjacent the actuators on the first and second switchers. The bar can be slid between a first position in which the bar blocks the operator on the first switch from operating the first switch to the "on" position, and a second position in which the bar blocks the operator on the second switch from operating the second switch to the "on" position, thereby preventing both switches from simultaneously being in their "on" positions.

6 Claims, 3 Drawing Sheets

5,790,369

1

POWER TRANSFER DEVICE FOR A UTILITIES DISTRIBUTION PEDESTAL

FIELD OF THE INVENTION

This invention relates to a power transfer device for a utilities distribution pedestal for switching between utility power and an auxiliary generator, and in particular to such a device that eliminates the possibility of back feeding power to the utility lines when the auxiliary generator is in use.

BACKGROUND OF THE INVENTION

A utility distribution pedestal is a device commonly used in the telecommunications industry for distributing the electric power for the operation of wireless communication sites. The utility distribution pedestal is typically connected to the local electric utility as its primary source of power. However, it is desirable that a utility distribution pedestal include some provision for connecting to a secondary power source, such as an emergency generator, to power the system in the event of an interruption of power from the local electric utility. It is important that the connections with the electric utility and the second power source be electrically isolated, or else power delivered from the secondary source could energize the local electric utility lines, posing a hazard to workers trying to repair the local electric utility system.

In some existing utility distribution pedestals an elaborate walking beam switch control apparatus is included to prevent electric power from a secondary source from backfeeding to the local electric utility lines. While these devices are adequate, they are complicated and expensive.

SUMMARY OF THE INVENTION

The present invention relates to a power transfer device that is of extremely simple and inexpensive construction, yet which reliably isolates the connections between the electric utility and the secondary power source to prevent the possibility of back-feeding electric power to the electric utility lines, while allowing quick and easy transfer between the two power sources. Generally the power transfer device of the present invention comprises first and second switches, and a bar slidably mounted between the switches. The first switch, connected to the first power source, has a actuator for operating the switch between an "on" position in which the first power source is electrically connected to the distribution pedestal, and an "off" position in which the first power source is electrically disconnected from the distribution pedestal. The second switch, connected to the second power source, has an actuator for operating the switch between an "on" position in which the second power source is electrically connected to the distribution pedestal, and an "off" position in which the second power source is electrically disconnected from the distribution pedestal. The bar is slidably mounted between the first and second switches, adjacent the actuators on the first and second switches, and is operable between a first position in which the bar blocks the actuator on the first switch from operating the first switch to the "on" position, and a second position in which the bar blocks the actuator on the second switch from operating the second switch to the "on" position, thereby preventing both switches from being in their "on" positions at the same time.

Thus the device ensures that the power sources connected to the first and second switches are electrically isolated, and prevents power being back-fed from one power source to the

2 other power source. The device is of simple construction and low cost, and can be made from readily available, standard off the shelf components, and allows fast and easy switching between two power sources.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
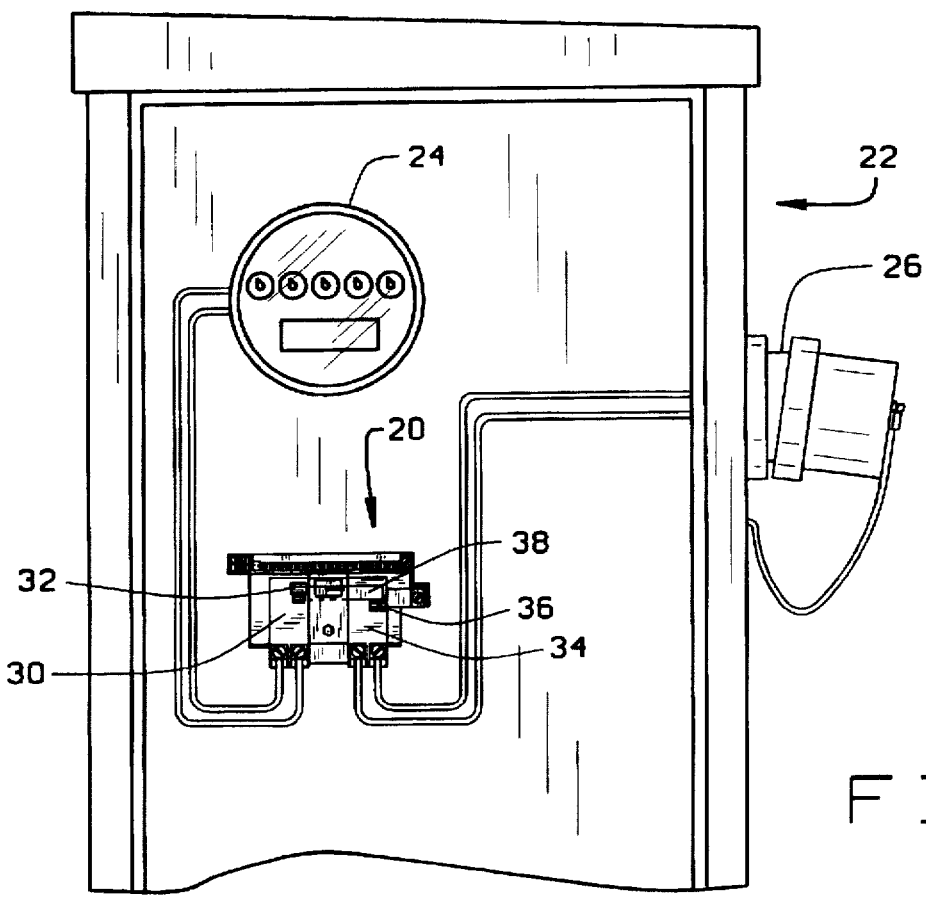
FIG. 1 is a front elevation view of a utilities distribution pedestal incorporating a power transfer device constructed according to the principles of this invention.
Figure 2:
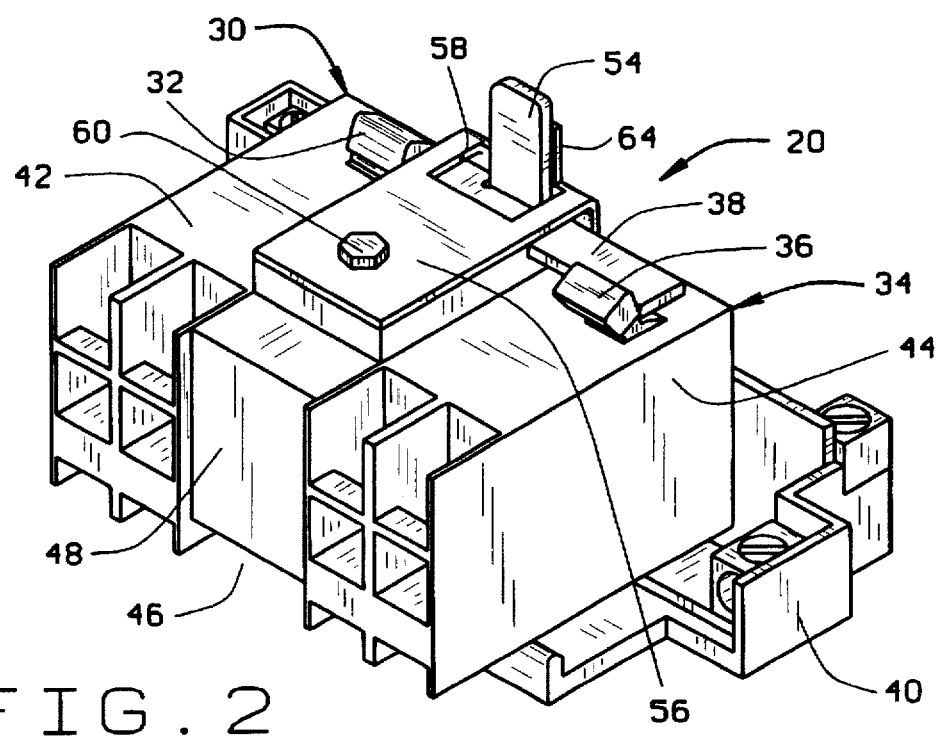
FIG. 2 is a perspective view of the power transfer device.

A power transfer device constructed according to the principles of this invention, indicated generally as 20, is shown in FIG. 1 as it would be mounted in a utilities distribution pedestal 22. The utilities distribution pedestal 22 distributes power provided by two alternate sources to a system such as a wireless communication site. As shown in FIG. 1, the power transfer device 20 is connected to first power source, in this preferred embodiment, a public utility power line through an electric meter 24. As shown in FIG. 1, the power transfer device 20 is connected to second power source, in this preferred embodiment a connector 26 which is adapted to be connected to an auxiliary generator. The power transfer device 20 ensures that only one of the two power sources is electrically connected to the utilities distribution pedestal at one time.

The power transfer device 20 comprises a first switch 30, connected to the first power source. The first switch 30 has an actuator 32 for operating the switch between an "on" position in which the first power source is electrically connected to the distribution pedestal, and an "off" position in which the first power source is electrically disconnected from the distribution pedestal. The power transfer device 20 also comprises a second switch 34, connected to the second power source. The second switch 34 has an actuator 36 for operating the switch between an "on" position in which the second power source is electrically connected to the distribution pedestal, and an "off" position in which the second power source is electrically disconnected from the distribution pedestal.

Figure 4:
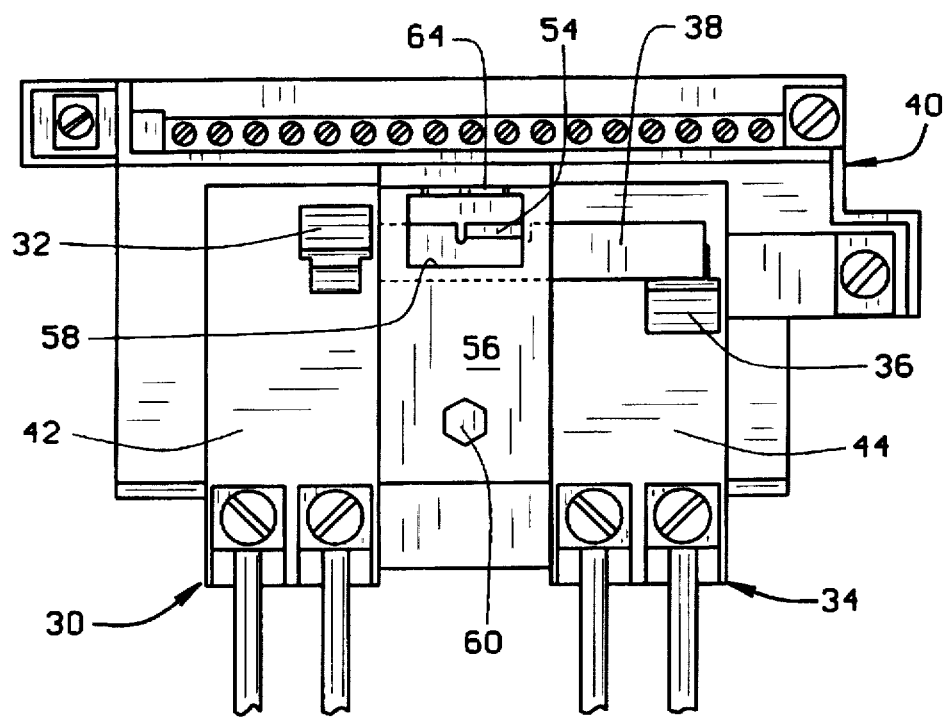
FIG. 4 is a front elevation view of the power transfer device, with the slide bar in its second position.
Figure 5:
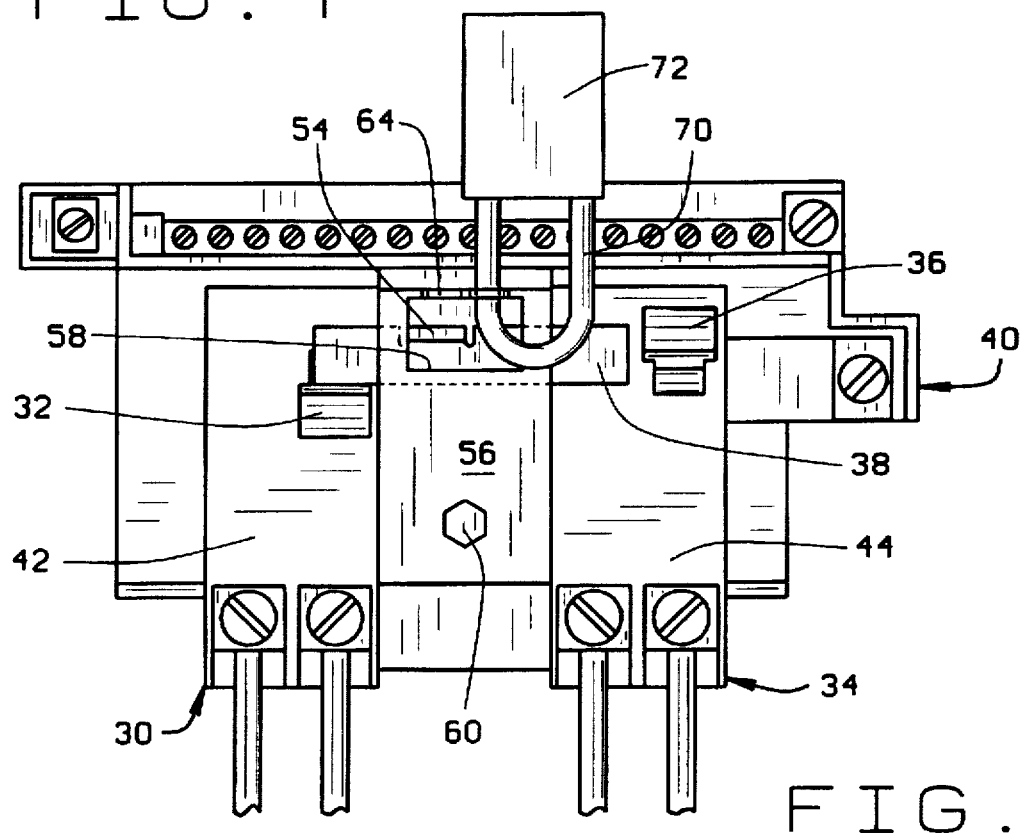
FIG. 5 is a front elevation view of the power transfer device, with the slide bar in its first position.

A bar 38 is slidably mounted adjacent the actuators 32 and 36 of the first and second switchers 30 and 34. The bar 38 is slidable between a first position in which the bar blocks the actuator 32 on the first switch 30 from operating the first switch to its "on" position (FIG. 5), and a second position in which the bar blocks the actuator 36 on the second switch 34 from operating the second switch to its "on" position (FIG. 4). Thus, the power transfer device 20 prevents both switches 30 and 34 from simultaneously being in their "on" positions. This prevents one power source from energizing the lines connecting to the other power source.

Figure 3:
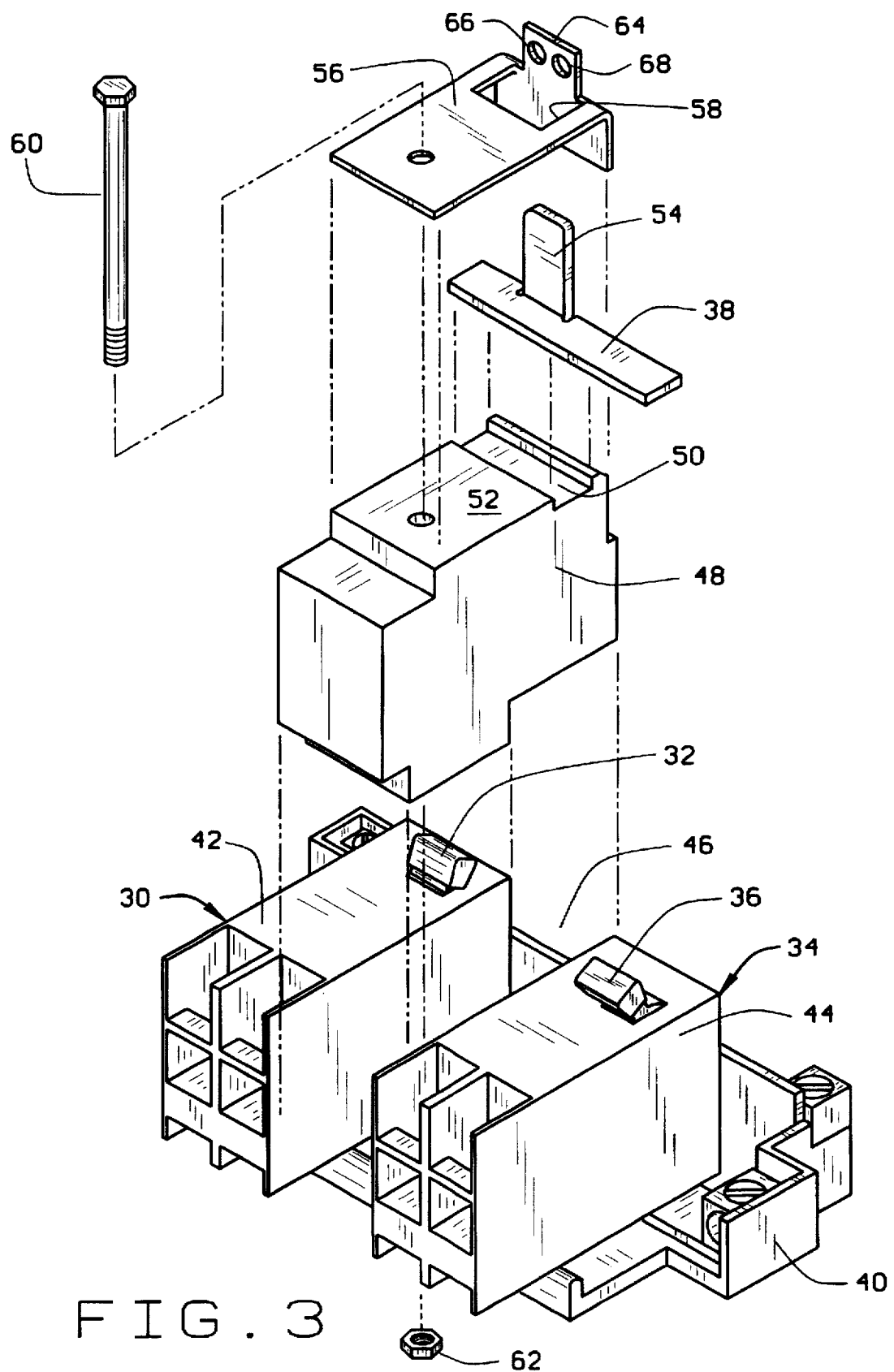
FIG. 3 is an exploded perspective view of the power transfer device.

As shown in FIG. 3, the power transfer device 20 preferably comprises a conventional circuit breaker panel 40, for example a load center interior made by Square D Company. The first switch 30 is preferably a circuit breaker 42 mounted on the panel, and the second switch 34 is a circuit breaker 44 mounted on the panel. The first and second circuit breakers 42 and 44 are separated by a space 46. These circuit breakers are preferably standard commercial circuit breakers, such as those available from Square D Company. A support block 48 made of a non-conductive material, such as nylon, is mounted in the space 46 between the breakers 42 and 44 on the panel 40. The support block 48 has a groove 50 in the front face 52 for slidably mounting the bar 38. The bar 38 has a tab 54 projecting therefrom. A bracket 56 is mounted over the front face 52 of the support block 48, with an opening 58 therein through which the tab 54 projects. The bracket 56 is mounted with a bolt 60 that extends through a hole in the block and through the panel 40. The bolt 60 is secured with a nut 62. A tongue 64 projects from the bracket, and has holes 66 and 68 for receiving the loop of a padlock for engaging the tab 54 on the bar 38, locking the bar in either the first or second position.

OPERATION

In operation, the power transfer device 20 is usually configured so that power from the first power source is delivered to the pedestal, the bar 38 is in its second position, the end of the bar blocking the actuator 36 of the second switch 34 from being moved to operate the second switch to the "on" position (see FIG. 4). The loop of a padlock could be placed through the hole 66 to prevent unauthorized movement of the bar. In the event of a utility power failure, an auxiliary power source can be connected to connector 26. The actuator 32 of the first switch 30 must be moved to turn the first switch to its "off" position in order for the bar 38 to be moved to allow the actuator 36 of the second switch 34 to be moved to turn the second switch to its "on" position. The loop 70 of a padlock 72 can be placed through the hole 68 to prevent unauthorized movement of the bar.

The power transfer device prevents both power sources from being electrically connected to the utilities distribution pedestal at once, and thus prevents one of the power sources from powering the lines of the other power source. This means that work can proceed safely on the system that is not being used so that repairs can be effected with reduced risk of injury to the workers.

I claim:

1. In a utilities distribution pedestal for distributing electric power provided by first and second alternate power sources, a power transfer device for electrically isolating the power sources so that only one power source is electrically connected to the distribution pedestal at one time, the power transfer device comprising:

a first switch, connected to the first power source, having an actuator for operating the switch between an "on" position in which the first power source is electrically connected to the distribution pedestal, and an "off" position in which the first power source is electrically disconnected from the distribution pedestal;

a second switch, connected to the second power source, having an actuator for operating the switch between an "on" position in which the second power source is electrically connected to the distribution pedestal, and an "off" position in which the second power source is electrically disconnected from the distribution pedestal;

a support block, made of a nonconductive material, between the first and second switches, said support block having a front face with a groove; and a substantially rectangular bar having a long axis and slidably mounted in the groove on the support block, the bar adjacent the actuators on the first and second switches, the bar slidable along the long axis between a first position in which the bar blocks the actuator on the first switch from switching the first switch to the "on position", and a second position in which the bar blocks the actuator on the second switch from switching the second switch to the "on" position, thereby preventing both switches from simultaneously being in their "on" positions.

2. A power transfer device for electrically isolating two alternate power sources to a power distribution device so that only one power source is electrically connected to the power distribution device at one time, the power transfer device comprising:

a first switch, connected to a first power source, having an actuator for operating the switch between an "on" position in which the first power source is electrically connected to the distribution device, and an "off" position in which the first power source is electrically disconnected from the distribution device;

a second switch, connected to a second power source, having an actuator for operating the switch between an "on" position in which the second power source is electrically connected to the distribution device, and an "off" position in which the second power source is electrically disconnected from the distribution device;

a support block, made of a nonconductive material, between the first and second switches, said support block having a front face with a groove; and a substantially rectangular bar having a long axis and slidably mounted in the groove on the support block, the bar adjacent the actuators on the first and second switches, the bar slidable along the long axis between a first position in which the bar blocks the actuator on the first switch from switching the first switch to the "on position", and a second position in which the bar blocks the actuator on the second switch from switching the second switch to the "on" position, thereby preventing both switches circuit breakers from simultaneously being in their "on" positions.

3. The power transfer device according to claim 2 wherein the first and second switchers comprise circuit breakers.

4. A power transfer device in accordance with claim 2 further comprising a tab projecting from said bar.

5. A power transfer device in accordance with claim 2 further comprising a bracket mounted over said front face of said support block.

6. A power transfer device in accordance with claim 5 further comprising a tongue projecting from said bracket, said tongue having at least one hole for receiving a loop of a padlock.

* * * * *